United States Patent [19]
Krall

[11] Patent Number: 5,114,659
[45] Date of Patent: May 19, 1992

[54] BLOW MOLDING METHOD FOR FORMING A ONE-PIECE SELF-DRAINING CONTAINER

[75] Inventor: Thomas J. Krall, Toledo, Ohio

[73] Assignee: Owens-Illinois Plastic Products Inc., Toledo, Ohio

[21] Appl. No.: 533,632

[22] Filed: Jun. 5, 1990

Related U.S. Application Data

[63] Continuation-in-part of Ser. No. 314,312, Feb. 22, 1989, abandoned, which is a continuation of Ser. No. 160,478, Feb. 25, 1988, abandoned.

[51] Int. Cl.⁵ .................. B29C 49/04; B29C 49/54
[52] U.S. Cl. ............................ 264/539; 264/318; 249/59; 425/525; 425/438
[58] Field of Search .......... 264/539, 537, 318, 328.1, 264/382.11; 425/525, 532, 533, 438, 577; 249/59, 184

[56] References Cited

U.S. PATENT DOCUMENTS

| | | | |
|---|---|---|---|
| 2,601,039 | 6/1952 | Livingstone | 222/109 |
| 2,743,844 | 5/1956 | Livingstone | 222/111 |
| 2,763,403 | 9/1956 | Livingstone | 222/111 |
| 2,793,790 | 5/1957 | Kahler | 222/109 |
| 2,804,654 | 9/1957 | Sherman | 264/539 |
| 2,911,673 | 11/1959 | Soubier | 425/525 |
| 3,029,471 | 4/1962 | Adams et al. | 18/30 |
| 3,364,521 | 1/1968 | Valyi | 264/537 |
| 3,537,676 | 11/1970 | Miller | 249/59 |
| 3,833,150 | 9/1975 | Visser-Patings | 222/109 |
| 4,115,496 | 9/1978 | Krall | 264/537 |
| 4,550,862 | 11/1985 | Barker et al. | 222/109 |
| 4,616,759 | 10/1986 | Mahler | 215/228 |
| 4,640,855 | 2/1987 | St. Clair | 428/36 |
| 4,671,421 | 6/1987 | Reiber et al. | 215/228 |
| 4,695,421 | 9/1987 | Takeda | 264/318 |
| 4,706,829 | 11/1987 | Li | 215/354 |
| 4,929,410 | 5/1990 | Meyer et al. | 264/533 |

FOREIGN PATENT DOCUMENTS

| | | |
|---|---|---|
| 1125509 | 10/1956 | France . |
| 57-072824 | 5/1982 | Japan ......................... 425/438 |
| 188590 | 1/1937 | Switzerland . |
| 678883 | 9/1952 | United Kingdom . |
| 2094220 | 9/1982 | United Kingdom . |

Primary Examiner—Jan H. Silbaugh
Assistant Examiner—Catherine Timm

[57] ABSTRACT

A self-draining container and method of forming. The container includes a body and a wall extending upwardly from a body opening. The wall surrounds a dispensing spout which extends above the top of the wall. A web joins the wall and the dispensing spout to form a drain channel. A drain opening is defined adjacent the channel for draining fluid from the channel into the container body. A cap having a depending skirt defining a thread which mates with an internal thread on the container wall to close the container.

11 Claims, 7 Drawing Sheets

BLOW MOLDING METHOD FOR FORMING A ONE-PIECE SELF-DRAINING CONTAINER

CROSS REFERENCE TO RELATED APPLICATIONS

This is a continuation-in-part of patent application Ser. No. 07/314,312, filed Feb. 22, 1989, now abandoned which is a continuation of application Ser. No. 07/160,478, filed Feb. 25, 1988 now abandoned.

BACKGROUND OF THE INVENTION

Self-draining containers are known in the art. These containers include means for returning contents which have dripped or run down the exterior of the pouring spout during use to the main body of the container.

Examples of prior art self-draining closures are shown in U.S. Pat. Nos. 4,550,862 and 4,640,855.

One of the primary problems with prior art self-draining containers is that they include multiple parts. In addition, prior art self-draining containers often require intermediate or post assembly steps to accomplish the self-draining feature. Additionally, in the embodiment of the container disclosed in the parent application, some difficulty has been encountered with distortion of threads in the molding operation.

SUMMARY OF THE INVENTION

The self-draining container, according to the present invention, is a single integral unit which does not include multiple parts to be assembled subsequent to forming except for application of a cap or closure to seal the package. The container is completed upon molding and post-molding operations are not required.

The container includes a body portion which terminates in an opening through which the contents can be dispensed. An integrally formed dispensing portion extends from and communicates with the body portion. The dispensing portion includes a collar or wall which extends around the body opening. An integral dispensing spout is located within and encircled by the collar. The upper end of the dispensing spout extends above the top of the collar. A web portion extends between the collar and the dispensing spout. The exterior of the spout, the web and the collar define a channel into which fluid may be received when the container is inverted. A drain opening is provided in or adjacent the bottom of the channel through which the fluid in the channel may drain back into the body of the container when the container is uprighted.

A method of molding the container is also disclosed including a method of molding which provides internal threads with superior thread definition and lack of distortion.

DESCRIPTION OF THE PREFERRED EMBODIMENTS

Figure 1:
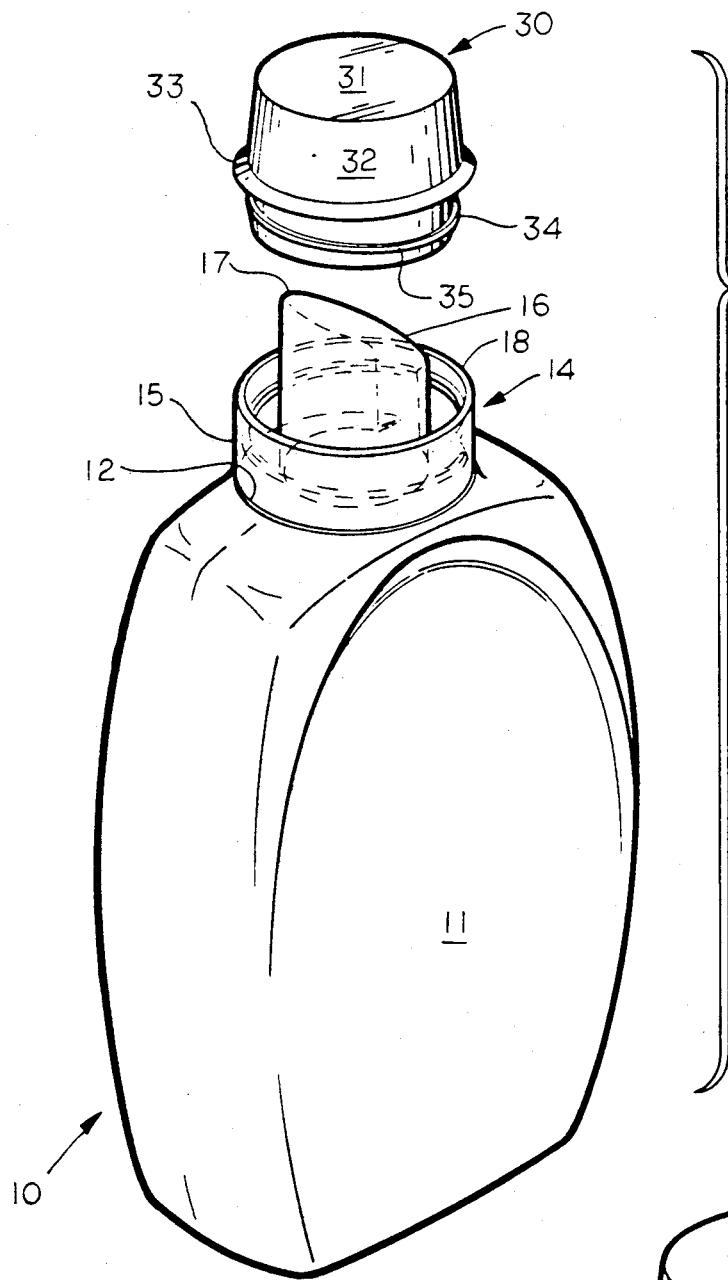
FIG. 1 is a perspective view showing a container, according to the present invention, with a cap positioned above the container.

A self-draining container, according to the present invention, is generally indicated by the reference number 10. While the self-draining container 10, depicted in the drawings, is a plastic bottle specifically designed for liquids, other self-draining containers which fall within the scope of the present invention may be constructed of other materials and used to contain liquids, powders or granules.

The self-draining container 10 includes a body portion 11 which terminates in an opening 12 through which the contents of the container 10 can be dispersed.

An integrally formed dispensing portion 14 extends from and communicates with the body portion 11. The dispensing portion 14 includes a circular wall 15 which extends annularly around the body opening 12. A dispensing spout 16 is located within and is encircled by the wall 15. The dispensing spout 16 includes an upper end 17 which extends above a top 18 of the wall 15.

A connecting web 20 extends between the wall 15 from an elevation below the top 18 to the dispensing spout 16. The web 20 connects the wall 15 and the dispensing spout 16 and cooperates with the wall 15 and the dispensing spout 16 to define a channel 21 into which fluid flowing from the exterior of the dispensing spout 16 may drain when the container 10 is uprighted after it has been inverted for pouring. The web 20 extends at least halfway around the dispensing spout 16 to prevent flow of liquid into the channel 21 when the container 10 is partially inverted to a pouring position.

A drain opening 23 is provided adjacent the channel 21. Fluid which is received in the channel 21 may drain back into the body 11 of the container 10 after the container is uprighted subsequent to pouring. In the embodiment shown in FIGS. 1-3, the drain opening 23 is defined by both the dispensing spout 16 and the web 20. However, in other embodiments, the channel 21 may be continuous having only a step portion with the drain being defined solely by the dispensing spout (not shown).

Figure 3:
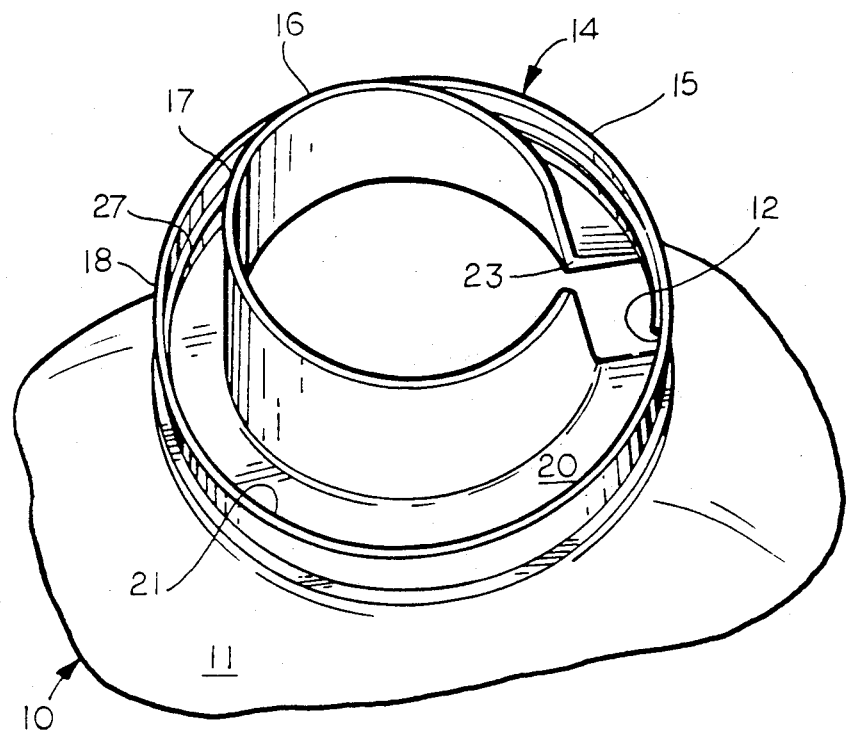
FIG. 3 is an enlarged section view of the upper part of the container shown in FIG. 1.
Figure 4:
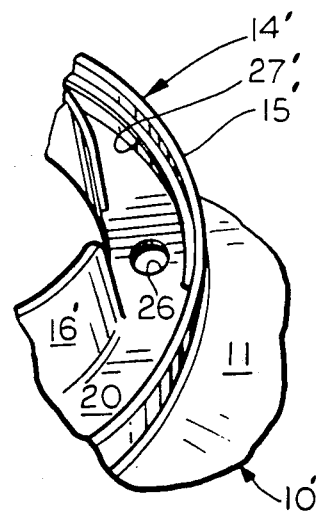
FIG. 4 is a fragmentary view of another embodiment of a container, according to the present invention.

Another embodiment of the invention is shown in FIG. 4. In this embodiment, a drain opening 26 comprises a circular hole which extends through the web 20'. In both embodiments, shown in FIGS. 3 and 4, the drain opening 23 or the drain opening 26 is in an opposed relationship to the upper end 17 of the dispensing spout 16 or 16'.

Threads 27 are formed on the inside of the circular wall 15. Similarly, threads 27' are formed on the inside wall 15' of the FIG. 4 embodiment. Referring to FIG. 1, a closure or cap 30 includes a top 31 and a depending sidewall 32. A sealing ring 33 extends radially outwardly from the sidewall 32 and a cylindrical skirt 34 depends downwardly below the ring 33. External threads 35 are formed on the exterior surface of the skirt 34 and cooperate with the threads 27 defined on the interior wall 15 of the container 10.

It is understood that in other embodiments of the present invention, the threads may be located on the exterior wall and mate with cap threads located on the interior of the cap.

Figure 2:
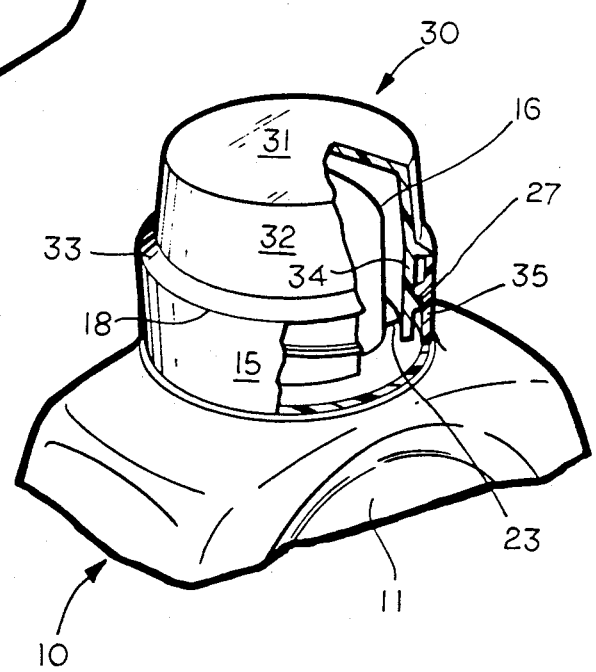
FIG. 2 is a fragmentary view of the top part of the container with the cap in place.

FIG. 1 shows the cap 30 removed, while FIG. 2 shows the cap 30 in position on the container 10. When in the closed position, as shown in FIG. 2, the sealing ring 33 of the cap 30 engages the top 18 of the wall 15 of the container 10 to provide a proper seal.

Figure 5:
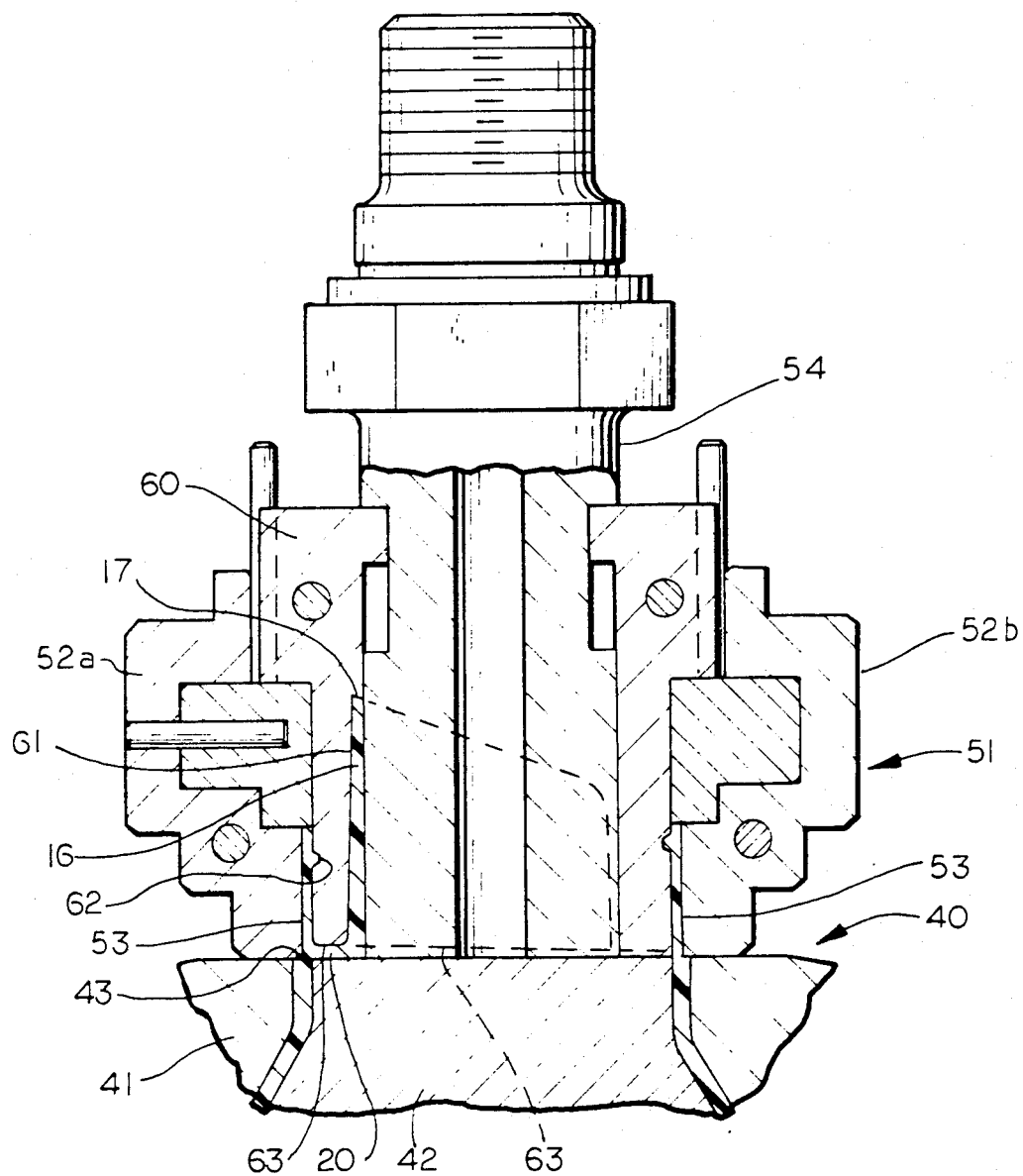
FIG. 5 is a fragmentary view, partially in cross section, showing the finish portion of a container according to the present invention, being formed in a molding machine.

Referring to FIG. 5, the self-draining container 10 may be produced within the normal cycle of a blow molding machine of a type used by the assignee of the present invention known as a BC-3 machine. No post-molding operations are needed to produce the desired self-draining finish on this type of machine. A portion of a BC-3 machine is generally indicated by the reference number 40. Details of a BC-3 machine method are disclosed in Sherman U.S. Pat. No. 2,804,654, which is incorporated herein by reference. This type of blow molding may be characterized as injection-extrusion blow molding and is used by the assignee of the present invention and others with a machine designated as a BC-3 machine.

In the method utilized by the BC-3 machine, the upper neck or finish portion of the container is first injection molded in an injection mold. Upon completion of the injection molding step, the injection mold is raised from the orifice of the injection die head while a length of heated and plasticized tubing is extruded from the die head. The tubing is connected to the injection molded finish and is drawn upwardly as the tubing is extruded. After the proper length of tubing has been extruded, blow mold halves close around the tubing and air is introduced through the injection mold assembly to expand the tubing in the closed mold to form the remainder of the container. These steps are shown as described in U.S. Pat. No. 2,804,654.

In FIG. 5 the extrusion die is designated by the numeral 40 and includes a bushing 41 and mandrel 42 which cooperate to define an orifice 43 through which the heated and plasticized material is expelled. Also shown is a moveable neck ring assembly 51 which is mounted (by means not shown) for movement downwardly into engagement with the orifice 43 during the injection molding step and for movement upwardly during the extrusion step to draw the oncoming tubing away from the orifice 43. The neck ring assembly 51 includes neck ring halves 52a and 52b which can open and close radially and which have interior wall portions 53 against which the exterior surface of the annular wall 15 of the container is molded. Also included is a core pin 54 having a passageway extending longitudinally therethrough through which pressurized air may be introduced into the extruded tubing after such tubing is enclosed within the blow mold to thereby expand the tube in the blow mold and form the body of the container. The core pin 54 forms the interior surface of the spout 16 of the container.

A sleeve 60 encircles the core pin 54 and has a recess 61 of a configuration to form the upper end 17 and outer surface of the spout 16. The lower exterior portion of the sleeve 60 forms the interior surface of the annular wall 15 and has a thread recess 62 in which the threads 27 are molded. The lower end 63 of the sleeve 60 is angled such that during the injection molding step it is spaced from the mandrel for a major portion around its circumference to cooperate therewith to form the web 20 as shown at the left in FIG. 5 but is in contact with the mandrel for a minor portion as shown at the right in FIG. 5 to form the drain opening 23 (see FIG. 3) without the necessity of a post-forming operation.

Figure 6:
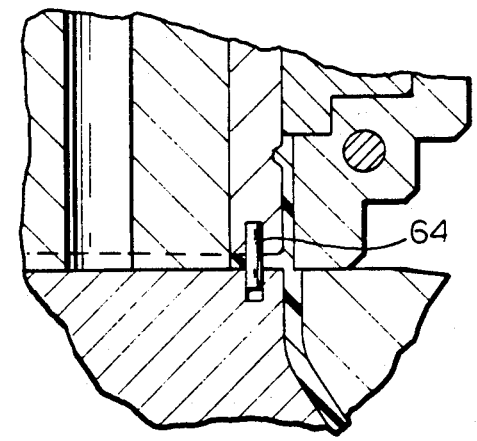
FIG. 6 is a fragmentary view, similar to FIG. 5 showing the finish portion of the FIG. 4 container embodiment being formed in a molding machine.

Similarly, referring to FIG. 6, a BC-3 machine may have a pin 64 mounted on the lower end of the sleeve 60 to form the drain opening 26 (see FIG. 4) of the self-draining container 10'. Again, the self-draining container 10' may be manufactured on a BC-3 machine without the necessity of post-forming operations on the bottle finish.

Referring now to FIGS. 7-13, there is shown an improved self-draining container 10" along with method and apparatus for forming and ejecting such container from the mold in which the spout, web and wall were injection molded.

Figure 7:
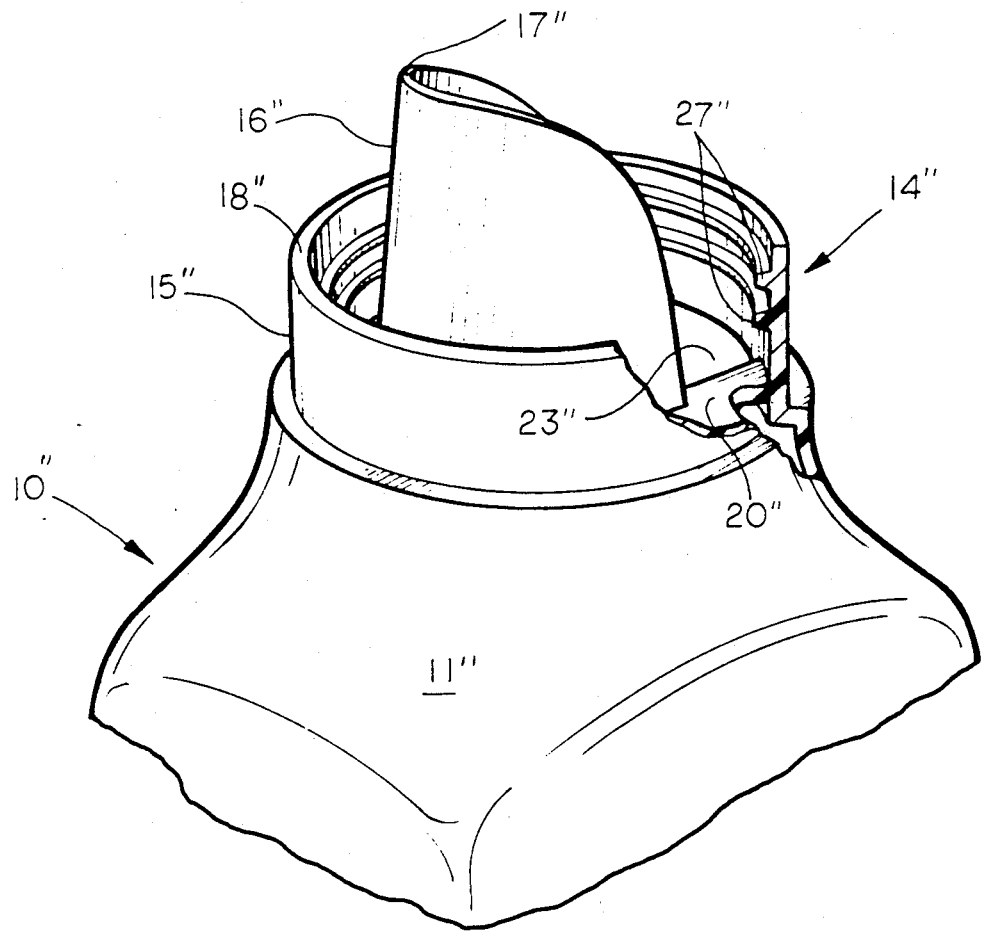
FIG. 7 is a partial perspective, partially in section, showing another embodiment of the present invention.

As indicated above, in forming bottles in accordance with the previous embodiment, difficulty has been encountered with distortion of the threads 27 molded into the interior surface of the circular wall 15. Thus, as can be seen in FIGS. 1, 2 and 5, the wall 15 has an internal thread 27 formed in a thread cavity 62 which may be characterized as a single thread, i.e., one having an arcuate extent on the order of one to one and one-half turns if it is desired to provide the same overlap between the leading upper end and trailing lower end. Referring to FIG. 7, there is provided a modified bottle 10" having a body portion 11" and a dispensing portion 14" which includes a cylindrical wall 15", a dispensing spout 16" encircled by said wall 15" and joined thereto by a web 20" having a drain opening 23". The spout includes an upper end 17" which extends above the top 18" of the wall 15". The inner surface of the wall 15" has formed therein a thread 27" which extends at least two complete turns so that any section cut axially through such wall 15" will have two separate and distinct portions of the thread 27". As previously mentioned it has been discovered, surprisingly, that forming a container having a spout 16" and encircling wall 15" with an internal thread 27" of such length, permits the container 10" to stripped from the injection mold without causing distortion to the thread 27".

Figure 8:
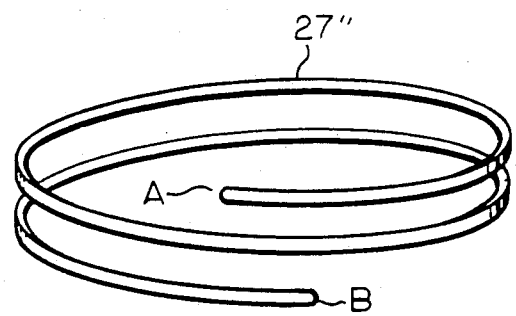
FIG. 8 is a schematic view illustrating the length of thread to be molded on the inner surface of the cylindrical wall.
Figure 9:
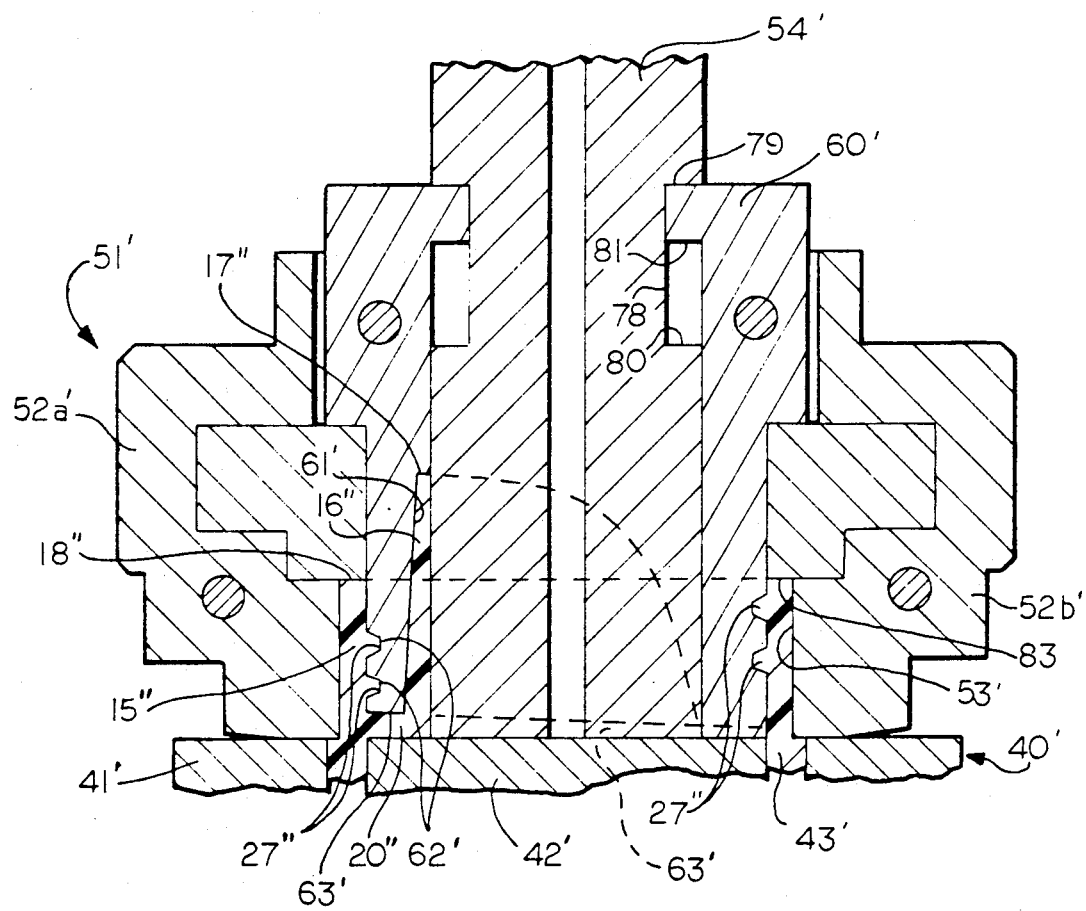
FIG. 9 is a sectional view showing apparatus for injection molding the spout web and annular wall of the modified invention.
Figure 10:
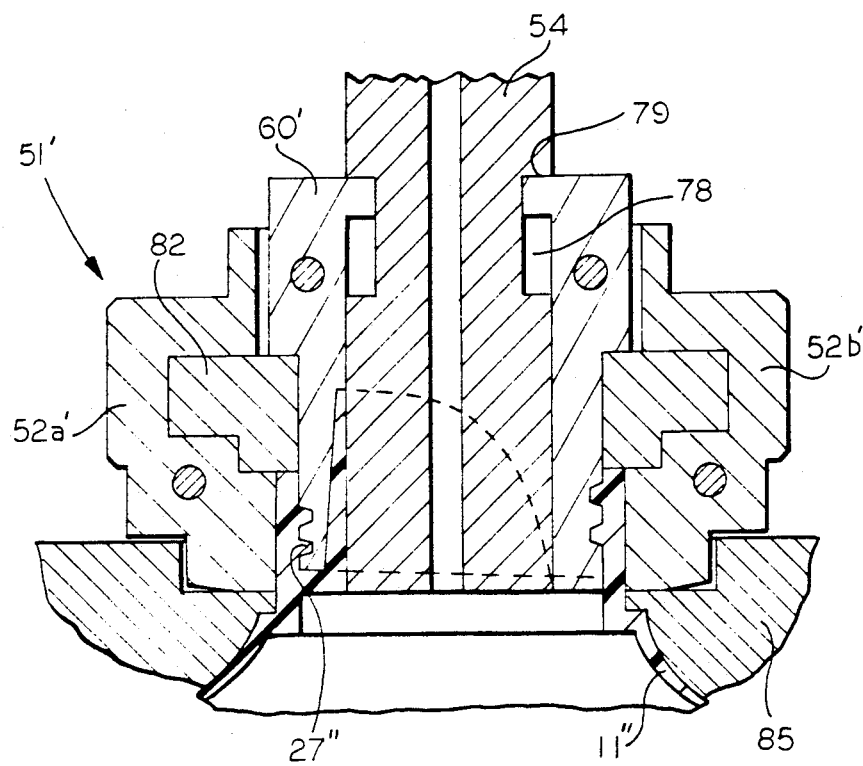
FIG. 10 is a sectional view showing apparatus for injection molding the spout, web and wall portion and showing a portion of a closed blow mold with the body portion of the container blown therein.

FIG. 8 shows schematically the length of the thread 27" as having a length slightly in excess of two full turns so that there is some overlap in the ends A and B with the result that a section taken through the wall 15" between the respective ends would pass through three thread segments.

Referring now to FIGS. 9-13, there is provided an extrusion die 40' having a bushing 41' and mandrel 42' which cooperate to define an orifice 43' through which heated and plasticized material is expelled. A moveable neck ring assembly 51' is mounted by means (not shown) for movement downwardly into engagement with the orifice 43' during the injection molding step and movement upwardly during the extrusion step to draw the oncoming tubing away from the orifice 43'. The neck ring assembly 51' includes neck ring halves 52a' and 52b' which can open and close radially and which have interior wall portions 53' against which the exterior surface of the wall 15" of the container is molded. Also included is a core pin 54' having a passageway extending longitudinally therethrough through which pressurized air may be introduced into the extruded tubing after such tubing is enclosed in a blow mold 85 to thereby expand the tube in the blow mold and form the body 11" of the container 10". (See FIG. 10). The core pin 54' forms the interior surface of the spout 16" of the container. The core pin 54' has a recessed area 78 extending from an upper ledge 79 to a lower ledge 80.

A sleeve 60' encircles the core pin 54' and has a recess 61' of a configuration to form the upper end 17" and the outer surface of the spout 16". The lower exterior portion of the sleeve 60' forms the interior surface of the wall 15" and has a thread recess 62' in which the thread 27" is molded. The length of the thread recess 62' is such as to provide at least two complete turns (i.e., 720°) so that in any axial section of the wall 15", there will always be at least two thread segments. This is true irrespective of where the axial section is taken throughout the entire 360° of the wall 15". The lower end 63' of the sleeve 60' is angled such that during the injection molded step, it is spaced from the mandrel for a major portion around its circumference to cooperate therewith to form the web 20". The upper end of the sleeve 60' is provided an inwardly extending flange 81 which is positioned in the recessed area 78 of the core pin 54'. A stripper ring 82 encircles the sleeve 60' and has a lower molding surface 83 which forms the upper surface 18" of the wall 15".

Figure 11:
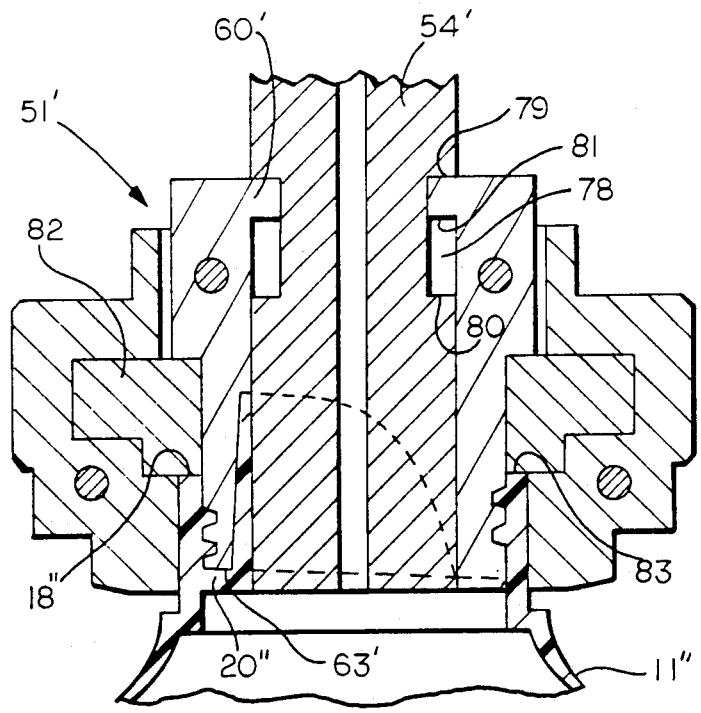
FIG. 11 is a sectional view showing apparatus for injection molding the spout, web and wall portion with a portion of a newly formed body of the container depending therefrom.
Figure 12:
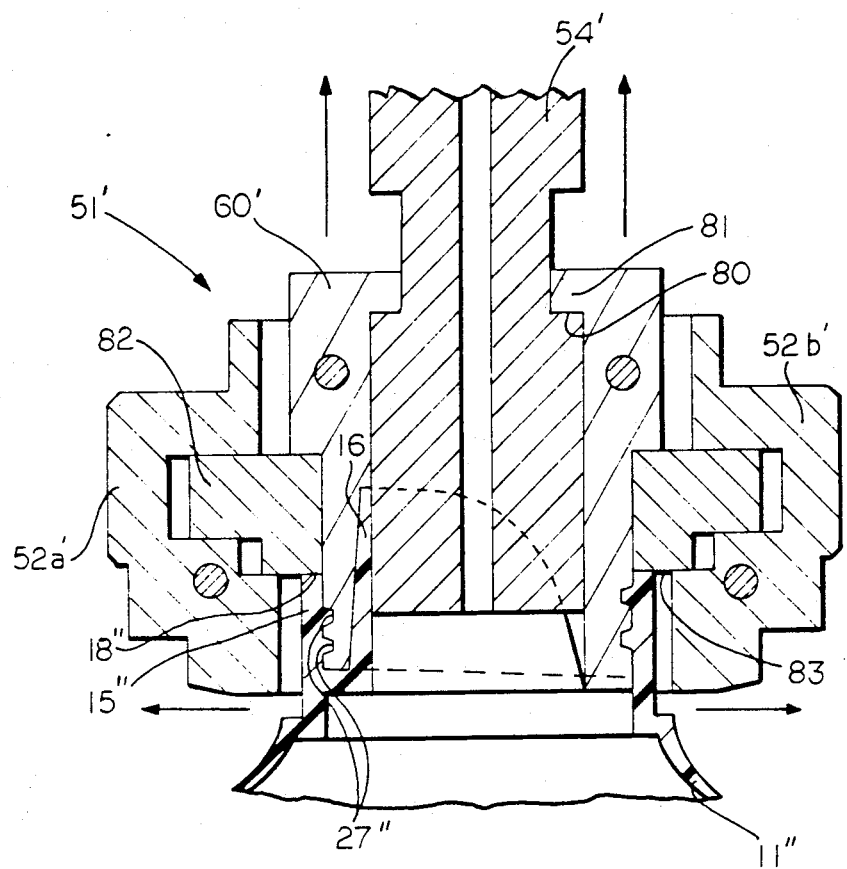
FIG. 12 is a view similar to FIG. 11 showing initial movement of portions of said injection molding apparatus during removal therefrom of the spout, web and wall with its depending newly formed body portion.
Figure 13:
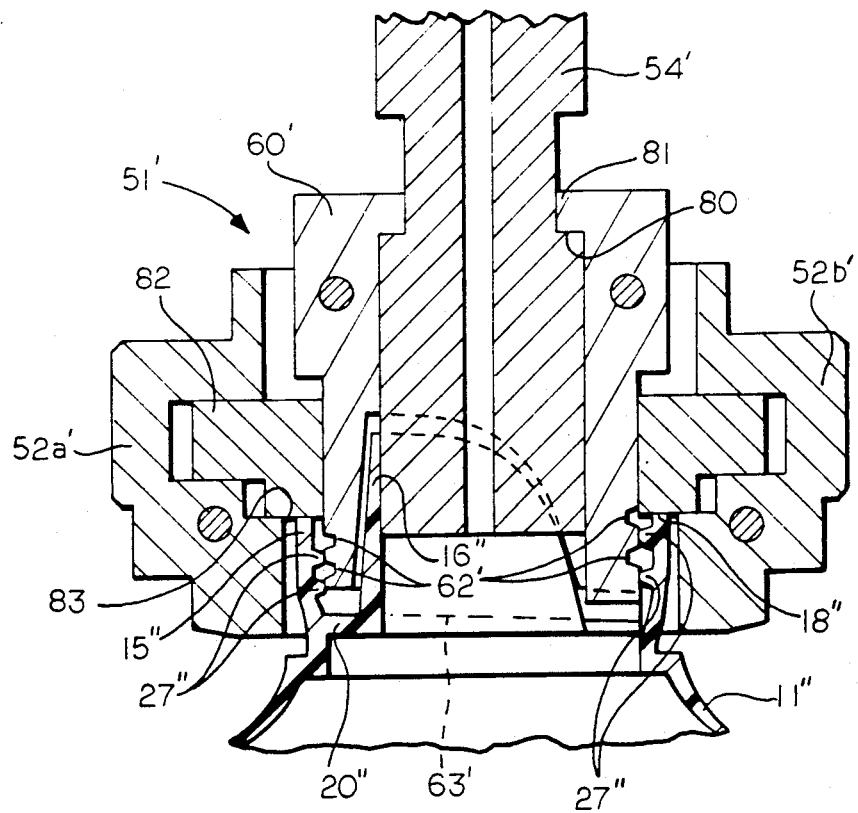
FIG. 13 is a view similar to FIGS. 11 and 12 showing further movement of the injection molding apparatus to strip the spout, web and wall therefrom.

Referring now to FIGS. 11-13, following blowing of the body portion 11" of the container 10", the spout 16", web 20", and wall 15" may be removed from the neck ring assembly 51'. This is normally done after the halves of the blow mold 85 in which the body portion 11" was molded have been opened. Such removal is accomplished by the sequence of steps hereinafter described. Initially, the neck ring halves 52a' and 52b' are moved to the partially open position shown in FIG. 12. Simultaneously with or immediately following the partial opening of the neck ring halves 52a' and 52b', the core pin 54' is elevated to partially withdraw it from the spout 16". Thereafter, the core pin 54' is moved further upwardly so that its ledge 80 engages the inwardly extending flange 81 of the sleeve 60'. Such engagement followed by continued upward movement of the core pin 54' draws the sleeve 60' upwardly. Engagement of the top 18" of the wall 15" against the lower molding surface 83 of the stripper ring 82 prevents upward movement of the container 10" as the sleeve 60' moves upwardly and thus causes the wall 15" with its internal thread 27" to be axially stripped therefrom. As can be seen particularly in FIG. 13, the thread 27" is forced radially out of the thread recess 62' of the sleeve 60' and is stretched over the sleeve portion adjacent the thread recess 62'. The stripping of containers having a thread with less than two full turns in this manner has resulted in thread distortion producing containers which, although functionally usable, were less than commercially desirable.

Many revisions and changes may be made to the various elements of the preferred embodiments of the self-draining container and its method of manufacture described above without departing from the scope of the following claims.

I claim:

1. The process of forming a one-piece self-draining plastic container comprising the steps of,
    (a) providing a cavity in an injection mold defining
        (i) a spout forming portion,
        (ii) a cylindrical wall forming portion having an outer surface and an inner surface including a thread forming projection extending around the inner surface of said cylindrical wall forming portion for at least two complete turns
        (iii) a web forming portion interconnecting the spout forming portion and cylindrical wall forming portion, each of said portions opening to the exterior of said mold;
    (b) imparting relative movement between an extrusion die head for extruding heated and plasticized plastic material and said injection mold to engage said injection mold and said die head to close said cavity;
    (c) injecting plastic material from said die head into said cavity to fill said cavity to form a pouring spout, cylindrical wall and integral web interconnecting said spout and said cylindrical wall with a thread integral with and extending at least two complete turns around on the inner surface of said cylindrical wall;
    (d) imparting relative movement between said die head and said injection mold while extruding plastic material in the form of tubing from said die head, said tubing having a diameter at least equal to the diameter of said cylindrical wall;
    (e) closing mold halves about the extruded tubing;
    (f) expanding the tubing to form a self-draining plastic container having a closed bottom and said integral pouring spout, web and cylindrical wall; and,
    (g) opening said mold halves and moving said pouring spout, cylindrical wall and integral web axially relative to said spout forming portion and said cylindrical wall forming portion to strip said pouring spout, cylindrical wall and web from said cavity and said thread from said thread forming projection, said thread being stretched as it is stripped from said thread forming projection such that the final thread is not distorted.

2. The process of forming a one-piece self-draining plastic container comprising the steps of,
    (a) providing a cavity in an injection mold defining
        (i) a spout forming portion;
        (ii) a cylindrical wall forming portion having an outer surface and an inner surface including a thread forming projection defining at least two full turns around said inner surface; and,
        (iii) a web forming portion interconnecting the spout forming portion and cylindrical wall forming portion, each of said portions opening to the exterior of said mold;
    (b) imparting relative movement between an extrusion die head for extruding heated and plasticized plastic material and said injection mold to engage said injection mold and said die head to close said cavity;

(c) injecting plastic material from said die head into said cavity to fill said cavity to form a pouring spout, cylindrical wall with an internal thread extending at least two full turns around said cylindrical wall and integral web interconnecting said spout and said cylindrical wall;

(d) imparting relative movement between said die head and said injection mold while extruding plastic material in the form of tubing from said die head;

(e) closing mold halves about the extruded tubing;

(f) blowing the tubing to form a self-draining plastic container having a closed bottom and said integral pouring spout, web and cylindrical wall; and (g) moving an outer surface cylindrical wall forming portion of said injection mold away from and into spaced relationship with said cylindrical wall and (h) thereafter moving said pouring spout, cylindrical wall and integral web axially relative to said spout forming portion and said cylindrical wall forming portion to strip said pouring spout, cylindrical wall including said internal thread and integral web from said spout forming portion, the inner surface of said cylindrical wall forming portion and said web forming portion of said injection mold, said internal thread being stretched as it is stripped from said thread forming projection such that the final thread is not distorted.

3. The process according to claim 2, wherein said tubing has a diameter substantially equal to the diameter of said cylindrical wall.

4. The process according to claim 2, wherein the step of injection molding said web forms a web having a circumferential extent greater than 180° but less than 360°.

5. A process for forming a self-draining plastic container having a body portion and an integrally formed dispensing portion including an upwardly extending dispensing spout, a web joined to and extending radially outwardly from the lower end of said dispensing spout, and an annular wall joined to and extending upwardly from said web spaced outwardly of and encircling said dispensing spout, said dispensing spout, said annular wall and said web cooperating to define a channel into which liquid draining down the outside of said dispensing spout may be captured, comprising the steps of:

(a) forming an injection cavity including:
  (i) a longitudinally extending spout cavity portion,
  (ii) a web cavity portion communicating with and extending radially outwardly from said spout cavity portion; and,
  (iii) a wall cavity portion encircling said spout cavity portion communicating with said web cavity portion;

(b) providing an extrusion die having a central mandrel terminating in an end and a bushing encircling the mandrel in spaced relationship to define an annular outlet, the end of said mandrel and the outlet of said bushing lying in substantially the same plane;

(c) providing a neck ring assembly having an interior core pin terminating in an end, a sleeve encircling said core pin and cooperating therewith to define said cavity conforming to the desired configuration of said spout, said sleeve having an end and a pair of partible neck ring halves moveable between open and closed positions and when closed, cooperating with said sleeve to define said cavity conforming to the desired configuration of said annular wall, the portion of said sleeve cooperating with said partible neck ring halves to form a cavity for said annular wall having a thread recess extending at least two full turns around said sleeve to form an internal thread on said annular wall, said annular wall having a cross-sectional size and shape generally conforming to that of the annular outlet of said extrusion die;

(d) moving said neck ring assembly into engagement with said extrusion die such that the closed neck halves contact the bushing, the end of the core pin contacts the end of said central mandrel and at least a portion of the sleeve end is spaced from the end of said central mandrel;

(e) forcing heated and plasticized thermoplastic material through the annular outlet of said extrusion die and into the cavities defined by said neck ring assembly and into the space between the end of the sleeve and the end of said central mandrel;

(f) moving said neck ring assembly away from said extrusion die while continuing to force heated and plasticized thermoplastic material therethrough to form a tubular parison substantially the same size as and depending from said annular wall;

(g) expanding said tubular parison in a blow mold to form said body portion; and, (h) following step (g) the neck ring halves are at least partially opened, the core pin is at least partially withdrawn from said spout and, thereafter, the annular wall including said internal thread is stripped from said sleeve.

6. A process for forming a self-draining plastic container having a body portion and an integrally formed dispensing portion including an upwardly extending dispensing spout, a web joined to and extending outwardly from the lower end of said dispensing spout, and a cylindrical wall joined to and extending upwardly from said web spaced outwardly of and encircling said dispensing spout, said cylindrical wall having a thread extending at least two full turns on the surface facing said dispensing spout, said dispensing spout, said cylindrical wall and said web cooperating to define a channel into which liquid draining down the outside of said dispensing spout may be captured, comprising the steps of:

(a) forming an injection cavity including
  (i) a longitudinally extending spout cavity portion;
  (ii) a web cavity portion communicating with and extending outwardly from said spout cavity portion; and,
  (iii) a wall cavity portion encircling said spout cavity portion communicating with said web cavity portion;

(b) providing an extrusion die having a central mandrel terminating in an end and a bushing encircling the mandrel in spaced relationship to define an annular outlet, the end of said mandrel and the outlet of said bushing lying in substantially the same plane;

(c) providing a neck ring assembly having an interior core pin terminating in an end, a sleeve encircling said core pin and cooperating therewith to define said cavity conforming to the desired configuration of said spout, said sleeve having a thread recess on the outer surface thereof extending at least two full turns and an end, and a pair of partible neck ring halves moveable between open and closed positions and when closed, cooperating with said sleeve including said thread recess to define a cavity conforming to the desired configuration of the cylindrical wall and said thread;

(d) moving said neck ring assembly into engagement with said extrusion die such that the closed neck ring halves contact the bushing, the end of the core pin contacts the end of said central mandrel and at least a portion of the sleeve end is spaced from the end of said central mandrel;

(e) forcing heated and plasticized thermoplastic material through the annular outlet of said extrusion die and into the cavities defined by said neck ring assembly and into the space between the end of the sleeve and the end of said central mandrel;

(f) moving said neck ring assembly away from said extrusion die while continuing to force heated and plasticized thermoplastic material therethrough to form a tubular parison depending from said cylindrical wall;

(g) expanding said tubular parison in a blow mold to form said body portion;

(h) at least partially opening said neck ring halves; and, (i) thereafter moving said dispensing spout, web and cylindrical wall axially relative to said sleeve and core pin to strip said dispensing spout, web and cylindrical wall therefrom including stripping said thread from said thread recess, said thread being stretched as it is stripped from said thread recess such that the final thread is not distorted.

7. A process for forming a self-draining plastic container having a body portion and an integrally formed dispensing portion including an upwardly extending dispensing spout, a web joined to and extending outwardly from the lower end of said dispensing spout, and a cylindrical wall joined to and extending upwardly from said web spaced outwardly of and encircling said dispensing spout, said cylindrical wall having a thread extending at least two full turns on the surface facing said dispensing spout, said dispensing spout, said cylindrical wall and said web cooperating to define a channel into which liquid draining down the outside of said dispensing spout may be captured, comprising the steps of:

(a) forming an injection cavity including
 (i) a longitudinally extending spout cavity portion;
 (ii) a web cavity portion communicating with and extending outwardly from said spout cavity portion; and,
 (iii) a wall cavity portion encircling said spout cavity portion communicating with said web cavity portion;

(b) providing an extrusion die having a central mandrel terminating in an end and a bushing encircling the mandrel in spaced relationship to define an annular outlet, the end of said mandrel and the outlet of said bushing lying in substantially the same plane;

(c) providing a neck ring assembly having an interior core pin terminating in an end, a sleeve encircling said core pin and cooperating therewith to define said cavity conforming to the desired configuration of said spout, said sleeve having a thread recess on the outer surface thereof extending at least two full turns and an end, and a pair of partible neck ring halves moveable between open and closed positions and when closed, cooperating with said sleeve including said thread recess to define said cavity conforming to the desired configuration of the cylindrical wall and said thread;

(d) moving said neck ring assembly into engagement with said extrusion die such that the closed neck ring halves contact the bushing, the end of the core pin contacts the end of said central mandrel and at least a portion of the sleeve end is spaced from the end of said central mandrel;

(e) forcing heated and plasticized thermoplastic material through the annular outlet of said extrusion die and into the cavities defined by said neck ring assembly and into the space between the end of the sleeve and the end of said central mandrel;

(f) moving said neck ring assembly away from said extrusion die while continuing to force heated and plasticized thermoplastic material therethrough to form a tubular parison depending from said cylindrical wall;

(g) expanding said tubular parison in a blow mold to form said body portion;

(h) at least partially opening said neck ring halves;

(i) at least partially withdrawing said core pin from said spout; and, (j) thereafter stripping said dispensing spout, web and cylindrical wall from said sleeve and core pin.

8. A process for forming a self-draining plastic container having a body portion and an integrally formed dispensing portion including an upwardly extending dispensing spout, a web joined to and extending outwardly from the lower end of said dispensing spout, and a cylindrical wall joined to and extending upwardly from said web spaced outwardly of and encircling said dispensing spout, said cylindrical wall having a thread extending at least two full turns on the surface facing said dispensing spout, said dispensing spout, said cylindrical wall and said web cooperating to define a channel into which liquid draining down the outside of said dispensing spout may be captured, comprising the steps of:

(a) providing a neck ring assembly having an interior core pin, a sleeve encircling said core pin and cooperating therewith to define a cavity conforming to the desired configuration of said spout, said sleeve having a thread recess on the outer surface thereof extending at least two full turns and a pair of partible neck ring halves moveable between open and closed positions and when closed, cooperating with said sleeve including said thread recess to define a cavity conforming to the desired configuration of the cylindrical wall and said thread;

(b) injection molding heated and plasticized thermoplastic material in said neck ring assembly to form said dispensing spout and cylindrical wall, including said thread, joined by said web;

(c) extruding a tubular parison depending from said cylindrical wall;

(d) expanding said tubular parison in a blow mold to form said body portion;

(e) at least partially opening said neck ring halves; and, (f) thereafter moving said dispensing spout, web and cylindrical wall axially relative to said sleeve and core pin to strip said dispensing spout, web and cylindrical wall including said thread from said sleeve and core pin, said thread being stretched as it is stripped from said thread recess such that the final thread is not distorted.

9. A process for forming a self-draining plastic container having a body portion and an integrally formed dispensing portion including an upwardly extending dispensing spout, a web joined to and extending outwardly from the lower end of said dispensing spout, and a cylindrical wall joined to and extending upwardly from said web spaced outwardly of and encircling said dispensing spout, said cylindrical wall having a thread extending at least two full turns on the surface facing said dispensing spout, said dispensing spout, said cylindrical wall and said web cooperating to define a channel into which liquid draining down the outside of said dispensing spout may be captured, comprising the steps of:
  (a) providing a neck ring assembly having an interior core pin, a sleeve encircling said core pin and cooperating therewith to define a cavity conforming to the desired configuration of said spout, said sleeve having a thread recess on the outer surface thereof extending at least two full turns and a pair of partible neck ring halves moveable between open and closed positions and when closed, cooperating with said sleeve including said thread recess to define a cavity conforming to the desired configuration of the cylindrical wall and said thread;
  (b) injection molding heated and plasticized thermoplastic material into said cavities within said neck ring assembly and around said core pin to form said dispensing spout and cylindrical wall joined by said web;
  (c) extruding a tubular parison depending from said cylindrical wall;
  (d) expanding said tubular parison in a blow mold to form said body portion;
  (e) at least partially opening said neck ring halves;
  (f) at least partially withdrawing said core pin from said spout by moving said core pin axially relative to said spout; and,
  (g) thereafter stripping said dispensing spout, web and cylindrical wall from said sleeve and core pin.

10. A process for forming a self-draining plastic container having a body portion and an integrally formed dispensing portion including an upwardly extending dispensing spout, a web joined to and extending outwardly from the lower end of said dispensing spout, and a cylindrical wall joined to and extending upwardly from said web spaced outwardly of and encircling said dispensing spout, said cylindrical wall having a thread extending at least two full turns on the surface facing said dispensing spout, said dispensing spout, said cylindrical wall and said web cooperating to define a channel into which liquid draining down the outside of said dispensing spout may be captured, comprising the steps of:
  (a) providing a neck ring assembly having an interior core pin, a sleeve encircling said core pin and cooperating therewith to define a cavity conforming to the desired configuration of said spout, said sleeve having a thread recess on the outer surface thereof extending at least two full turns and a pair of partible neck ring halves moveable between open and closed positions and when closed, cooperating with said sleeve including said thread recess to define a cavity conforming to the desired configuration of the cylindrical wall and said thread;
  (b) injection molding heated and plasticized thermoplastic material into said cavities within said neck ring assembly to form said dispensing spout and cylindrical wall joined by said web;
  (c) extruding a tubular parison depending from said cylindrical wall;
  (d) expanding said tubular parison in a blow mold to form said body portion;
  (e) at least partially opening said neck ring halves;
  (f) at least partially withdrawing said core pin from said spout by moving said core pin axially relative to said spout; and,
  (g) thereafter moving said dispensing spout, web and cylindrical wall axially relative to said sleeve and core pin to strip said dispensing spout, web and cylindrical wall including said thread from said sleeve and core pin, said thread being stretched as it is stripped from said thread recess.

11. A process for forming a self-draining plastic container having a body portion and an integrally formed dispensing portion including an upwardly extending dispensing spout, a web joined to and extending outwardly from the lower end of said dispensing spout, and a cylindrical wall joined to and extending upwardly from said web spaced outwardly of and encircling said dispensing spout, said cylindrical wall having a thread on the surface facing said dispensing spout, said dispensing spout, said cylindrical wall and said web cooperating to define a channel into which liquid draining down the outside of said dispensing spout may be captured, comprising the steps of:
  (a) providing a neck ring assembly having an interior core pin, a sleeve encircling said core pin and cooperating therewith to define a cavity conforming to the desired configuration of said spout, said sleeve having a thread recess on the outer surface thereof and a pair of partible neck ring halves moveable between open and closed positions and when closed, cooperating with said sleeve including said thread recess to define a cavity conforming to the desired configuration of the cylindrical wall and said thread;
  (b) injection molding heated and plasticized thermoplastic material into said cavities within said neck ring assembly to form said dispensing spout and cylindrical wall joined by said web;
  (c) extruding a tubular parison depending from said cylindrical wall;
  (d) expanding said tubular parison in a blow mold to form said body portion;
  (e) at least partially opening said ring halves;
  (f) at least partially withdrawing said core pin from said spout by moving said core pin axially relative to said spout; and,
  (g) thereafter moving said dispensing spout, web and cylindrical wall axially relative to said sleeve and core pin to strip said dispensing spout, web and cylindrical wall including said thread from said sleeve and core pin.

* * * * *